(12) United States Patent
Fager et al.

(10) Patent No.: US 12,350,741 B2
(45) Date of Patent: Jul. 8, 2025

(54) SYSTEMS AND METHODS FOR WELD TAPERING AT A TRAILING EDGE USING TIME MULTIPLEXING

(71) Applicant: Arcam AB, Molnycke (SE)

(72) Inventors: Mattias Fager, Vastra Gotaland (SE); Simon Blomé, Molnycke (SE); Linus Haglund, Molnycke (SE); Joakim Ålgårdh, Molnycke (SE); Alexander Dahl, Molnycke (SE)

(73) Assignee: Arcam AB, Molnycke (SE)

( * ) Notice: Subject to any disclaimer, the term of this patent is extended or adjusted under 35 U.S.C. 154(b) by 696 days.

(21) Appl. No.: 17/504,016

(22) Filed: Oct. 18, 2021

(65) Prior Publication Data
US 2022/0118521 A1    Apr. 21, 2022

Related U.S. Application Data

(60) Provisional application No. 63/092,821, filed on Oct. 16, 2020.

(51) Int. Cl.
| | |
|---|---|
| *B22F 12/47* | (2021.01) |
| *B22F 10/36* | (2021.01) |
| *B22F 10/366* | (2021.01) |
| *B22F 10/85* | (2021.01) |
| *B22F 12/41* | (2021.01) |
| *B22F 12/90* | (2021.01) |
| *B23K 15/00* | (2006.01) |
| *B33Y 30/00* | (2015.01) |
| *B33Y 50/02* | (2015.01) |

(52) U.S. Cl.
CPC ............. *B22F 12/47* (2021.01); *B22F 10/36* (2021.01); *B22F 10/366* (2021.01); *B22F 12/41* (2021.01); *B22F 12/90* (2021.01); *B23K 15/0086* (2013.01); *B33Y 30/00* (2014.12); *B22F 10/85* (2021.01); *B33Y 50/02* (2014.12)

(58) Field of Classification Search
CPC .......... B22F 10/85; B22F 12/47; B22F 12/41; B22F 12/90; B33Y 30/00; B33Y 50/02; B23K 15/0086
USPC ....................................................... 219/76.1
See application file for complete search history.

(56) References Cited

U.S. PATENT DOCUMENTS

| | | | |
|---|---|---|---|
| 3,401,253 A | 9/1968 | Foster | |
| 10,124,410 B2 | 11/2018 | Kanko et al. | |

(Continued)

FOREIGN PATENT DOCUMENTS

| | | |
|---|---|---|
| WO | 2016096407 | 6/2016 |
| WO | 2019028184 | 2/2019 |
| WO | 2019141115 | 7/2019 |

*Primary Examiner* — Thien S Tran
*Assistant Examiner* — Simpson A Chen
(74) *Attorney, Agent, or Firm* — Hanley, Flight & Zimmerman, LLC (57) ABSTRACT

Systems, apparatus, and methods for weld tapering at a trailing edge using time multiplexing are disclosed. Systems, apparatus, and methods for control of an electron beam for welding using time multiplexing are disclosed. An example apparatus includes memory and at least one processor to execute instructions to at least: in a first portion of a line of an object being formed, control an energy beam at a first position at a first time to form a weld from a powder; and in a second portion of a line of the object being formed, control the energy beam to perform a dispersion sweep at a second position at a second time.

19 Claims, 7 Drawing Sheets

(56) References Cited

U.S. PATENT DOCUMENTS

| | | |
|---|---|---|
| 10,589,377 B2 | 3/2020 | Vorontsov |
| 2017/0120337 A1 | 5/2017 | Kanko et al. |
| 2019/0009358 A1 | 1/2019 | Vorontsov |
| 2019/0134709 A1* | 5/2019 | Dave .................. B33Y 30/00 |
| 2019/0217416 A1* | 7/2019 | Brochu ................ G06F 30/23 |
| 2020/0164438 A1 | 5/2020 | DeMuth et al. |
| 2020/0238566 A1* | 7/2020 | Lin .................... B22F 10/28 |
| 2020/0346303 A1 | 11/2020 | Xiao et al. |

\* cited by examiner

SYSTEMS AND METHODS FOR WELD TAPERING AT A TRAILING EDGE USING TIME MULTIPLEXING

CROSS-REFERENCE TO RELATED APPLICATIONS

This patent claims priority to U.S. Provisional Application Ser. No. 63/092,821, entitled "SYSTEMS AND METHODS FOR WELD TAPERING AT A TRAILING EDGE USING TIME MULTIPLEXING" which was filed on Oct. 16, 2020, and is hereby incorporated herein by reference in its entirety.

FIELD OF THE DISCLOSURE

This disclosure relates generally to additive manufacturing and, more particularly, to systems and methods for weld tapering at a trailing edge using time multiplexing.

BACKGROUND

Additive manufacturing is a process by which a three-dimensional structure is built, usually in a series of layers, based on a digital model of the structure. While some examples of additive manufacturing technology rely on sintering or melting/fusing using an energy source to form the structure, rather than "printing", in which material is deposited at select locations, the term "print" is often used to describe the additive manufacturing process (e.g., three-dimensional (3D) printing, 3D rapid prototyping, etc.). Examples of additive manufacturing techniques include Fused Deposition Modeling, Electron Beam Melting, Laminated Object Manufacturing, Selective Laser Sintering (including Direct Metal Laser Sintering, also referred to as Direct Metal Laser Melting or Selective Laser Melting), and Stereolithography, among others. Although 3D printing technology is continually developing, the process to build a structure layer-by-layer is complex, inefficient, and prone to failure. An error in the 3D process can lead to weakness or failure in the manufactured part and, therefore, waste, risk, and other unreliability.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Additive manufacturing is a process that enables highly customizable, dynamically deliverable parts manufacturer at a variety of locations. However, the flexible nature of an additive manufacturing process exposes that process to environmental variability, material quality fluctuation, programming/configuration glitches, etc. To address these and other issues, certain examples provide a new, improved control of tapered welding in additive manufacturing.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects, and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

In addition, it should be understood that references to "one embodiment" or "an embodiment" of the present disclosure are not intended to be interpreted as excluding the existence of additional embodiments that also incorporate the recited features.

The phrase "additive manufacturing apparatus" is used interchangeably herein with the phrase "printing apparatus" and term "printer", and the term "print" is used interchangeably herein with the word "build", referring to an action to build a structure using an additive manufacturing apparatus, regardless of the particular additive manufacturing technology being used to form the structure. As used herein, print and printing refer to the various forms of additive manufacturing and include three-dimensional (3D) printing or 3D rapid prototyping, as well as sintering or melting/fusing technologies. Examples of additive manufacturing or printing techniques include Fused Deposition Modeling, Electron Beam Melting, Laminated Object Manufacturing, Selective Laser Sintering (including Direct Metal Laser Sintering also referred to as Direct Metal Laser Melting or Selective Laser Melting), and Stereolithography among others.

For example, selective laser melting (SLM), also known as direct metal laser melting (DMLM), Direct Metal Laser Sintering (DMLS), or laser powder bed fusion (LPBF), is a rapid prototyping, 3D printing, or additive manufacturing (AM) technique designed to use a high power-density laser to melt and fuse metallic powders together. The SLM process can fully melt the metal material into a solid three-dimensional part, for example.

SLM is a part of additive manufacturing in which a high power density laser is used to melt and fuse metallic powders together. With SLM, thin layers of atomized fine metal powder are evenly distributed onto a substrate plate (e.g., a metal, etc.) using a coating mechanism. The substrate plate is fastened to an indexing table that moves in the vertical (Z) axis. This takes place inside a chamber containing a tightly controlled atmosphere of inert gas, either argon or nitrogen at oxygen levels below 500 parts per million, for example. Once each layer has been distributed, each two-dimensional (2D) slice of the part geometry is fused by selectively melting the powder. Melting of the powder is accomplished with a high-power laser beam, such as an ytterbium (Yb) fiber laser with hundreds of watts, etc. The laser beam is directed in the X and Y directions with two high frequency scanning mirrors. The laser energy is intense enough to permit full melting (welding) of the particles to form solid metal. The process is repeated layer after layer until the part is complete.

Direct Metal Laser Melting (DMLM) or Direct Metal Laser Sintering (DMLS) are particular type(s) of SLM that use a variety of alloys and allows prototypes to be functional hardware made out of the same material as production components. Since the components are built layer by layer, it is possible to design organic geometries, internal features, and challenging passages that could not be cast or otherwise machined. For example, DMLS produces strong, durable metal parts that work well as functional prototypes and/or end-use production parts, for example.

The DMLS process begins by slicing 3D computer-aided design (CAD) file data into layers (e.g., from 20 to 100 micrometers thick, 30-120 µm thick, 50-150 µm thick, etc.), creating a two-dimensional (2D) image of each layer. For example, a format of the 3D CAD file is a .stl file used on most layer-based 3D printing or stereolithography technologies. This file is then loaded into a file preparation software package that assigns parameters, values and physical supports that allow the file to be interpreted and built by different types of additive manufacturing machines, for example.

The DMLS machine uses a high-powered 200 watt Yb-fiber optic laser, for example. The machine includes a build chamber area including a material dispensing platform and a build platform along with a re-coater blade used to move new powder over the build platform. The technology fuses metal powder into a solid part by melting it locally using the focused laser beam. A melt pool is formed when the powder melts from exposure to the laser beam radiation. Parts are built up additively layer by layer (e.g., using layers 10 micrometers thick, 20 µm thick, 30 µm thick, 50 µm thick, etc.). The machine can include and/or operate with monitoring and control systems and methods, such as iterative learning control, continuous autocalibration, and real-time melt pool monitoring, etc., to introduce a step change in the build process performance and stability, for example. Certain examples enable melt pool monitoring, iterative learning control, continuous auto-calibration, real-time melt pool control, etc.

Other additive manufacturing methods, such as Electron Beam Melting (EBM), can be used for crack-prone metal alloys, such as titanium, etc. With EBM, high-performance electron beam sources and in-situ process monitoring using "self-generated" x-ray imaging and backscatter electron technologies can be used for improved quality control. A binder jet allows fast printing at lower cost with novel support structure designs and clean-burning binders to solve two key technology challenges of sintering distortion and material properties to enable additive manufacturing for automotive, other transportation solutions, powder generation, etc.

In power bed additive manufacturing technologies, such as EBM, DMLS, etc., intersections between contour and hatching often form a weakness in a resulting product. For example, fusing a hatched pattern with a contour melting is difficult both in terms of position as well as in terms of a weld. Hatching results in starting and stopping of weld pools, requiring precise control of an associated additive manufacturing system. Gross lack of fusion has been found evident in regions from an edge as well as inward (e.g., approximately 2-3 mm inward). Such regions are normally machined when producing a tensile specimen. These lack of fusion regions have been found to correlate with high temperatures and a translation speed of the weld. Certain examples address these challenges.

Keyhole welding can be used in additive manufacturing with a metal material. Within EBM, welding in "keyhole mode" uses a high intensity and a high velocity of an electron beam with respect to a powder bed and melt pool.

The high beam intensity, high velocity electron beam forms a vapor, as well as a melt pool, and results in a keyhole or capillary and a structured welding seam at trailing hatch line edges where the heat source is removed. That is, a keyhole mode weld has a deep, narrow profile which vaporizes material, forming a hole or opening filled with the vapor, allowing the energy beam to penetrate more deeply into the material. A lagging keyhole weld front solidifies rapidly, leaving a residual pit or keyhole in the material. Repeated residual keyholes cause powder dispatching to not function properly, leaving humps and filling the keyhole with powder, rather than melted material. As a result, lack of fusion is exhibited in close proximity to the trailing hatch line edge.

Certain examples avoid leaving a solidified keyhole by gradually lowering or tapering an effective beam current and speed while maintaining weld critical line energies and beam widths. Avoiding the keyhole avoids weakness associated with a powder-filled keyhole, for example. Tapering can occur over less than a millisecond, for example. In certain examples, time multiplexing of beam traces can be used to effectively create a lower beam current. Sampling of the electron beam is short enough (e.g., less than a millisecond) such that the weld does not react to the absence of heat input from the beam. Rather, the averaged energy input over time produces an even, fused, weld. Tapering the beam based on time multiplexing of beam traces can avoid uneven trailing edges formed by keyhole(s) and associated lack of fusion, reducing lack of fusion and leaving other regions unaffected, for example. A flatter contour hatch intersection reduces or eliminates lack of fusion at an intersection between contours and a hatch and provides better conditions for a powder dispatcher to work properly. High productivity can be maintained without compromise in optimal bulk weld parameters.

Using time multiplexing to control the electron beam heating of the powder material solves the lack of fusion and uneven keyholes without causing positioning problems, defocusing, and other issues. For example, varying beam current would result in high voltage loading and beam positioning problems. Defocusing of the beam can create weld profile and position variations, for example. Time multiplexing control of the beam avoids these issues and creates an effective lower beam current.

In electron beam melting (EBM), an electron beam serves as an energy carrier, allowing rapid electromagnetic beam control. During a hot process, the electron beam heats each layer of a build until an entire powder bed reaches an optimal process temperature specific to the material used in the powder bed. As a result, the EBM process produces components without residual stresses and has a microstructure free from martensitic structures. The electron beam melting process takes place in a vacuum chamber to help ensure a clean and controlled build environment. Vacuum production is an important aspect of the EBM process as the vacuum maintains the chemical specification of the build material in the powder bed. During sintering, parts are produced free floating in sintered powder. Sintering allows parts to be stacked tightly and eliminate, or limit, a need for mechanical support. Hatching relates to placement or melting of lines of material to form a printed structure.

During hatching, within each line segment of material, a region of interest is defined along with a "dummy" region. The region of interest is typically shorter or equal in length to an original line segment. The region of interest is divided into a plurality of smaller sub-regions of interest, and the sub-regions typically have the same length. During hatching, the electron beam travels along the line segment with constant standard settings until a start of the region of interest. Upon reaching the region of interest, a short, defined idle time is introduced by repeatedly scanning the defined dummy region at a speed that is higher than the speed at which the region of interest is scanned. Settings and configuration of subsystems are left unchanged except for adjustment of positioning, for example. Scanning of the region of interest continues with standard settings until completion of the first sub-region of interest. At the start of the second sub-region of interest, a slightly longer idle time is introduced through scanned of the dummy region, etc.

As such, certain examples enable fusion of a larger range of cross sections without lack of fusion while maintained a high scanning speed. Certain examples provide high material capabilities for material cross sections ranging in size from one millimeter and larger. Certain examples reduce a lack of fusion at a contour/hatch intersection. Certain examples reduce or eliminate use of hot isostatic pressing (HIP) to reduce fatigue in critical components while increasing a bulk hatch weld build rate. Certain examples enable thinner contours with smaller minimum feature size and higher print resolution. Certain examples provide less top surface undulation for more precise powder dispatching and decreased powder dispatching time.

Figure 1:
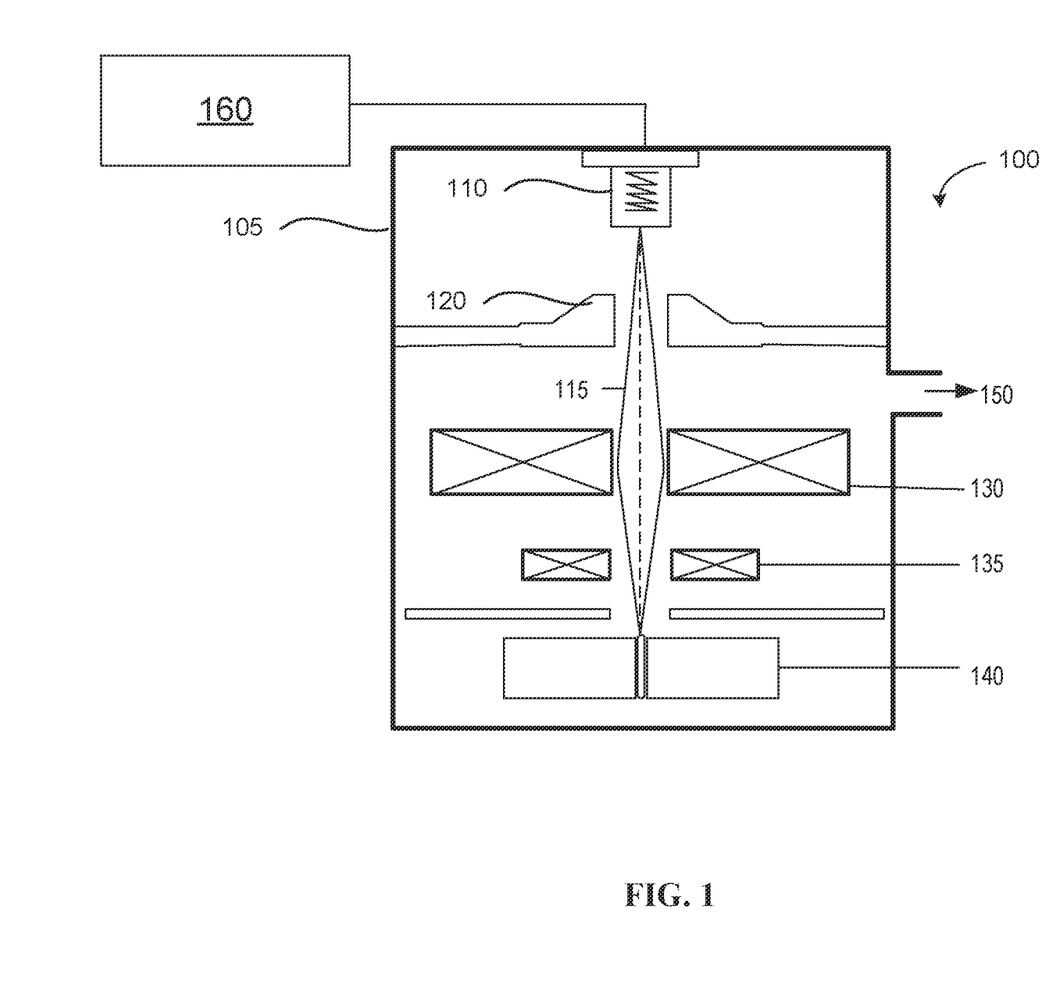
FIG. 1 depicts one example of an additive manufacturing apparatus that can be used in connection with systems and methods disclosed and described herein.

An example additive manufacturing apparatus 100, such as an EBM apparatus, is illustrated in FIG. 1. The example apparatus 100 includes a vacuum chamber 105 including an electron gun 110 (e.g., a cathode tube or negative pole) that generates, accelerates, and concentrates electrons in an electron beam 115 for discharge or firing toward an anode 120. The example anode 120 is a positive pole behind the electron gun 110 that attracts and provides a path for the electrons in the electron beam 115. A focusing coil 130 focuses the electron beam 115 on a workpiece 140, and a deflection coil 135 deflects the beam 115 to an expected work area of the workpiece 140. A vacuum pump 150 produces a vacuum in the chamber 105 using mechanical and/or electrical-powered pump(s) to establish a pressure of approximately 0.1 to 10 Pa in the chamber 105. An example controller 160 can be used to regulate or otherwise control the electron gun 110 and/or other component of the apparatus 100 such as the vacuum pump 150, etc. As such, the electron beam 115 is used to melt or fuse powder on the workpiece 140 under vacuum by extracting electrons from a filament (e.g., a tungsten filament, etc.) and projecting the electronics on a layer of metallic powder deposited on the workpiece 140. The electrons selectively fuse the powder to product the part or object being built.

In the example of FIG. 1, the controller 160 is a controller provided by a manufacturer of the additive manufacturing system 100 to control operation of the additive manufacturing system 100. In some examples, the controller 160 is a computer system that includes at least one processor and at least one memory device. In some examples, the controller 160 includes a 3D model and/or other file representing a component to be fabricated by the additive manufacturing system 100. In some examples, the controller 160 executes operations to control the operation of the additive manufacturing system 100. Operations executed by the controller 160 include controlling power output, speed, timing, etc., of the electron gun 110 to move the beam 115 in a line with respect to powder on the workpiece 140.

Using the controller 160, the electron gun 110 is controlled to slow down deposition of energy at the end of a line (e.g., close to the edge of a model or beam segment) being formed on the workpiece 140. In certain examples, the controller 160 lowers electron beam current and beam speed.

Lowering beam current and speed lessens or eliminates the keyhole effect and provides time for the melt pool of the workpiece 140 to catch up with the beam 115, even at depth.

However, in certain examples, lowering the beam current takes too much time to accomplish. Instead, lowering of the beam current can be simulated by dividing the end of the line into segments and running dispersion sweeps with the beam between each segment. In certain examples, straight line segments of an electron beam path run at a constant speed, focus offset, and beam current in an additive manufacturing process such as using the example apparatus 100. Each straight line segment can be referred to as an analyze package. Beam paths can be stored as analyze packages in the controller 160 and/or in a separate memory circuit accessible by the controller 160 to control the electron gun 110. An analyze package is a straight line segment run at a constant speed, focus offset, and beam current. A line is a contiguous set of analyze packages such that an end point of one analyze package is the starting point of a next analyze package. For example, a single hatch line over a single model, including burn points, etc., can be defined as a set of analyze packages.

Figure 2A:
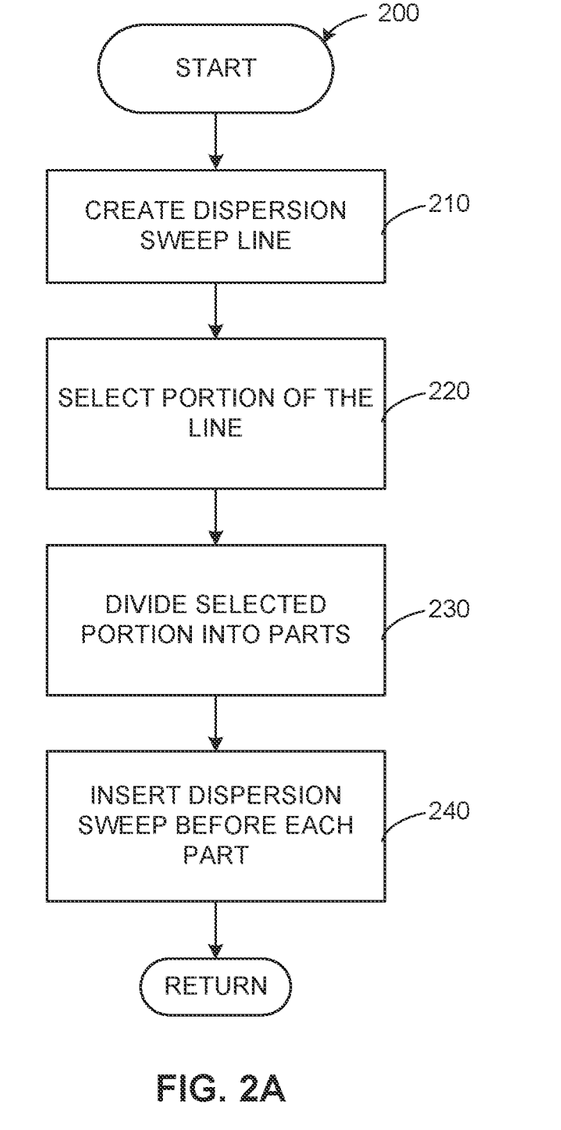
FIGS. 2A-2B illustrate example methods for control of an additive manufacturing process.

Dispersion sweeps of the electron beam 115 can be configured and facilitated by the controller 160 controlling the electron gun 110 to move the beam 115 to adjust weld tapering at an edge to reduce or avoid keyhole effects in a build. FIG. 2A illustrates an example method 200 to configure end heat dispersion (EHD) by the controller 160 to slow disposition of energy from the beam 115 at the end of a line of a build and provide a more controlled, uniform, and secure weld. At block 210, a dispersion sweep line is programmed. For example, the dispersion sweep line is a line of an EBM process in which the electron gun 110 moves the beam 115 at an EHD dispersion sweep speed rather than at a regular EBM process speed. The EHD dispersion sweep speed can be faster than the normal EBM process speed, slower than the normal EBM process speed, or the same as the normal EBM process speed, for example.

At block 220, at the end of the line, a part of the line corresponding to an EHD time parameter is selected. The selected line portion can split or span across analyze packages based on the time parameter, for example. The EHD time parameter relates to an EHD time, which is a time at an end of a line at which to apply end heat dispersion (EHD). Time is dynamic with respect to speed changes due to thickness, etc.

At block 230, the selected portion is divided into a plurality of equal parts (e.g., according to time, as measured before end heat dispersion is applied), according to an EHD step count corresponding to a number of interpolation levels. For example, the selected portion can be divided into two equal parts based on the EHD time parameter and EHD step count.

At block 240, a dispersion sweep is inserted before one or more of the parts. The dispersion sweep has a duration according to an EHD maximum time away, which is a percentage of time to spend on dispersion sweeps at the end of the line, linearly interpolated from zero, over different interpolation levels as set forth in the EHD step count. Each new dispersion sweep starts where the last one ended such that a situation in which all dispersion sweeps are put on a small section of the line is avoided.

In certain examples, forward and reverse dispersion sweeps can be utilized. An EHD reverse dispersion sweep, if enabled, reverses a direction of the dispersion sweep such that the sweep executes at an end of a line, rather than at a beginning. Employing the reverse dispersion sweep lessens a number of jumps of the start of the line. In certain examples, forward and reverse dispersion sweeps can be combined to form snake dispersion sweeps. In an EHD snake dispersion sweep, dispersion sweeps run back and forth over the line. This "snaking" lessens a number of jumps overall because the energy beam does not have to jump from end to end to start a dispersion sweep. Instead, the dispersion sweeps switch from forward to reverse without jumping to reposition the beam.

As such, the EBM formation of an object in a build can be time multiplexed to alternate, in at least a portion of the weld of a line of the build, between welding and dispersion sweep at different times/time periods/time slots, for example. Time periods and number of dispersion sweeps can be set to taper a weld at an edge or end of a line of the object build to avoid keyhole effects that can weak or otherwise disrupt the weld and the object resulting from the build.

In certain examples, the time for a dispersion sweep is calculated so that the time is a percentage of the total time for the dispersion sweep plus the relevant segment. That is, if the time away is at 50%, the dispersion sweep takes an equal amount of time as the line segment. Thus, the EHD Max Time Away setting must be strictly less than 100%; otherwise, all the time is spent on the dispersion sweep. Rather than a percentage of segment time, dispersion sweep percentage is linear with regards to time spent on dispersion sweeps compared to the total time. In certain examples, effective beam current follows a 1/(1+d) curve, where d is a percentage of total time spent on dispersion sweeps. The dispersion time can be expressed according to a d/(1−d) curve, for example. In other examples, the dispersion times are linear.

Figure 2B:
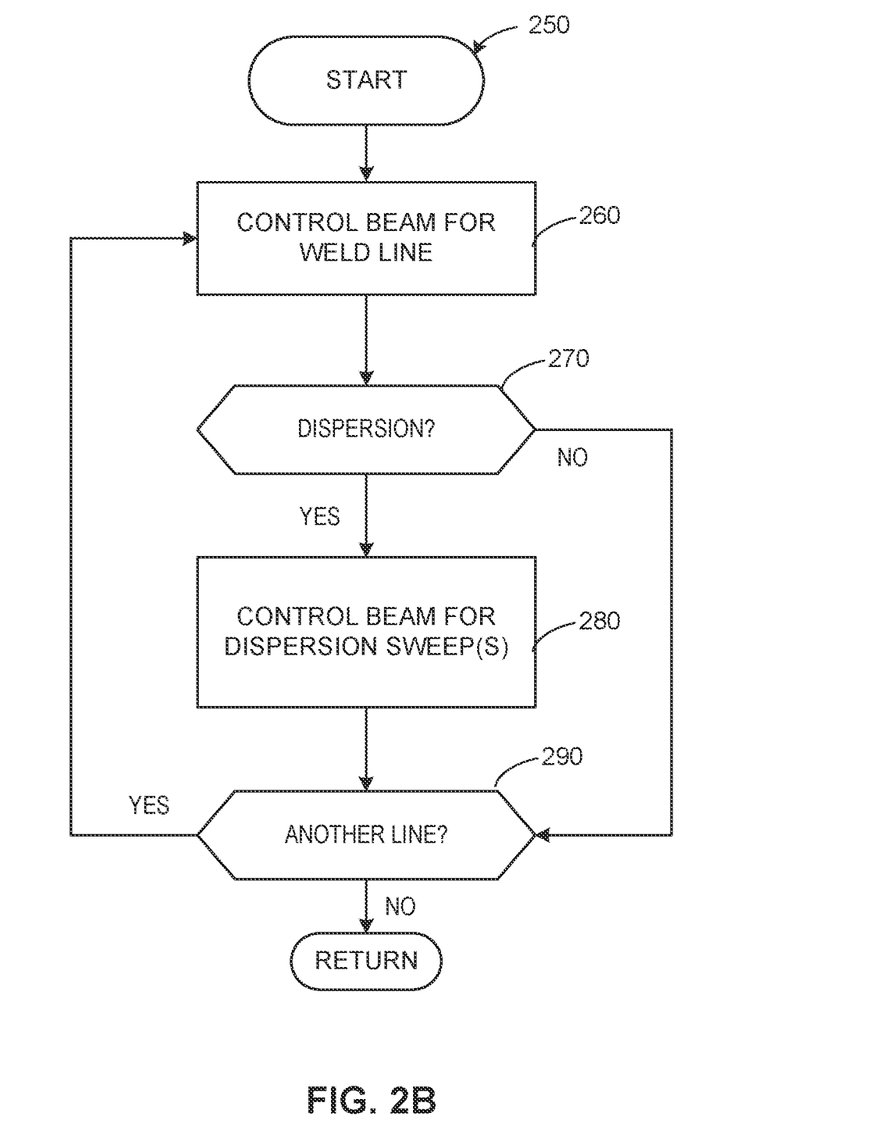

FIG. 2B illustrates an example method 250 to control the energy beam 115 (e.g., with the electron gun 110) to form an object using EBM. The example method 250 can leverage the dispersion sweep(s) configured according to the example method 200 of FIG. 2A. At block 260, the controller 160 controls the energy beam 115 in a welding position to form a weld line of a build. For example, the controller 160 controls the energy beam 115 to move through and melt or weld material in a welding or work area on the workpiece 140 to form the object. At block 270, the controller 160 evaluates whether to include a dispersion sweep. For example, a configuration of the controller 160 determines whether to include one or more dispersion sweeps to taper or adjust the weld at an edge of a line of the object being built or formed through the EBM process.

When a dispersion sweep is to be performed, at block 280, the controller 160 controls the energy beam 115 to perform one or more dispersion sweeps. For example, the controller 160 can move the beam 115 to a dispersion sweep area for one or more dispersion sweeps such as configured according to the example method 200 described above. At block 290, the controller 160 evaluates whether an additional line is to be formed to construct the object from the powder and/or other material on the workpiece 140. When an additional line remains, control reverts to block 260 for further melting or welding. Otherwise, if the object is complete, the example process 250 ends.

Figure 3:
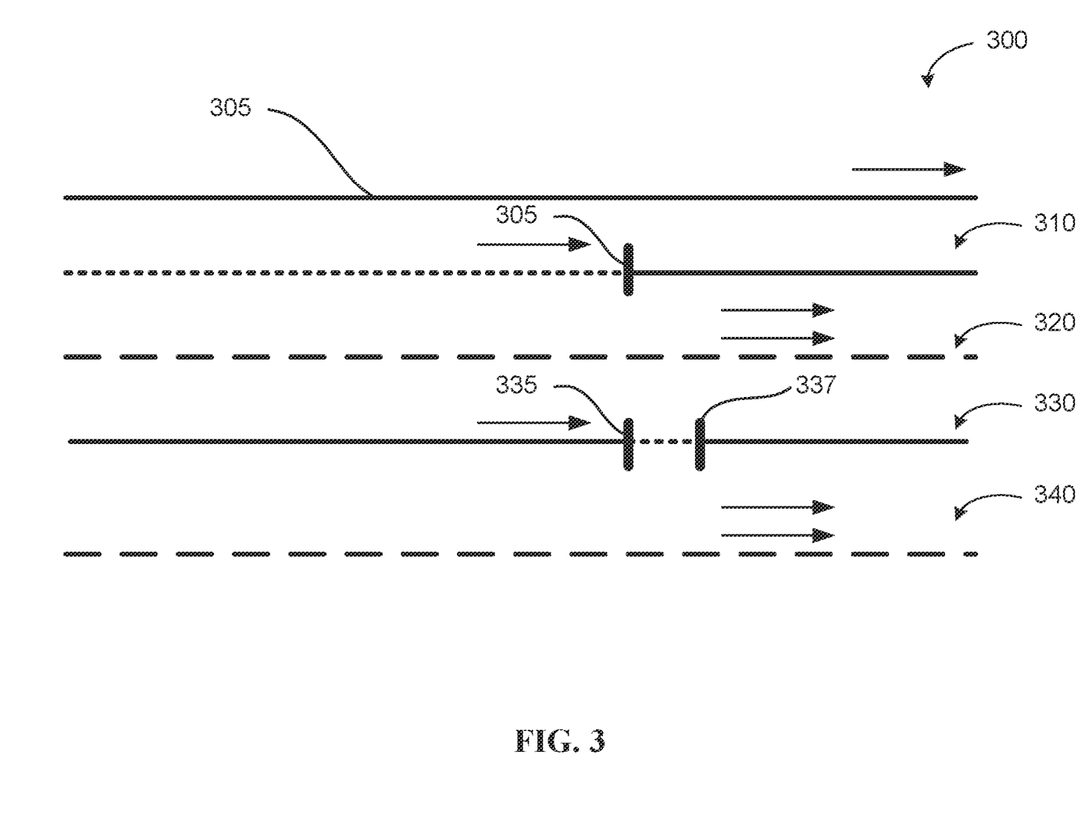
FIGS. 3-4 illustrate example weld lines and associated processes for time multiplexed control of an electron beam, such as provided by the example system of FIG. 1.

FIG. 3 illustrates an example sequence 300 of dispersion sweeps for line segments in an additive manufacturing operation. A line 305 to be melted is depicted in the example of FIG. 3. At 310, the line 305 is melted up to a point 315. At 320, "dummy sweeps", also referred to as dispersion sweeps herein, are run along the line 305, looping if necessary/desired. At 330, the line 305 is melted between elements 335 and 337. At 340, "dummy sweeps" are executed along the line 305, looping if necessary/desired. The process 300 continues until the entire line 305 has been melted. Each consecutive dummy sweep step or action lasts a bit longer than the previous one, for example.

Time spent on a dispersion sweep at an interpolation step n can be expressed as:

$$d_n = n \frac{\text{Max Time Away}}{\text{Step Count}}, \quad \text{(Equation 1)}$$

$$t_d = d_n \frac{t_m}{1 + d_n}, \quad \text{(Equation 2)}$$

where $t_d$ is a time spent on the dispersion sweep at step n, $d_n$ is a percentage of total time spent on dispersion sweeps at step n, and $t_m$ is a time spent on melting each segment (e.g., an equal time for each segment split along the line).

An effective beam current on segment n can be represented as:

$$I_n = I_m \frac{t_m}{t_m + t_d}, \quad \text{(Equation 3)}$$

which together with Equations 1 and 2 results in:

$$I_n = I_m(1 - d_n) \quad \text{(Equation 4)},$$

which is linear. In Equations 3 and 4, In is an effective beam current on segment n, and $I_m$ is a constant beam current applied.

In certain examples, for short lines in which the line takes a shorter time than the EHD Time, steps or actions are used until the line is complete, starting from the beginning of compensation such that a short line does not experience a maximum slowdown configured. This happens, for example, close to corners when the hatch is not aligned with the side of the model.

In certain examples, when used together with burn points, a burn point and EHD regions may overlap. In this case, the burn point is applied first, with EHD on top of the burn point. This can lead to a slightly modified burn point with a dispersion sweep in the middle. This may occur on short lines, for example, which results in a dispersion sweep covering the same area.

In certain examples, when used together with turning points, the turning points are applied first, and then the EHD. Similar to the burning points, the turning points can be modified.

Figure 4:
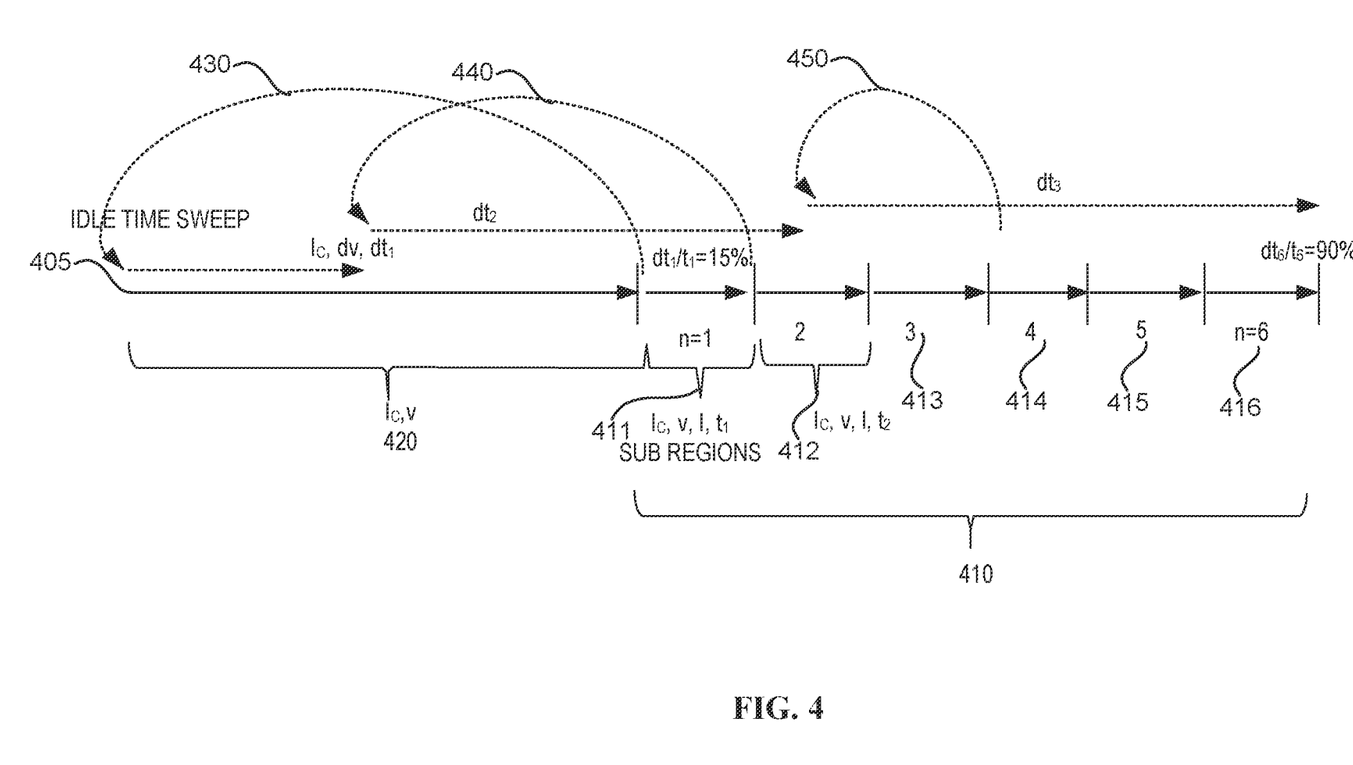

FIG. 4 depicts an example weld tapering using time multiplexing. As shown in the example of FIG. 4, $I_C$ represent a beam current, v represents speed, t is time, and l is length. The illustration of FIG. 4 shows another example of an end heat dispersion process 400 with respect to a weld line 405 and its region of interest 410. As shown in the example of FIG. 4, the region of interest 410 is divided into a plurality of subregions 411-416 (e.g., segments/interpolation stage n=1 . . . 6). An initial portion 420 of the weld line 405 is subject to an idle time sweep 430. The idle time sweep 430 is conducted with a certain beam current $I_C$ and beam speed v. Additional dispersion sweeps 440-450 over subregions 411-416 of the region of interest 410 are conducted with a beam current $I_C$ and beam speed v over a certain length l and time $t_1$, $t_2$, etc. A ratio of percentage of total time spent on dispersion sweeps to time spent on a particular dispersion sweep varies along the line 405 as illustrated in the example of FIG. 4 (e.g., $dt_1/t_1=15\%$, $dt_6/t_6=90\%$, etc.). As such, time multiplexing can be used to slow deposition of beam energy over a plurality of segments or time slots (e.g., $t_1$-$t_6$, $dt_1$-$dt_6$, etc.) by running dispersion sweeps between each segment 411-416 of the region of interest 410 in the line 405. Such control results in tapering of a weld at a trailing edge of the line 405.

Thus, certain examples move or "jump away" from a line with the electron beam and then back to the line at certain times while maintaining beam current and speed parameters. Such controlled movement increases idle time and reduces keyhole effects that can potentially weaken the weld line. Certain examples use the deflection system and electromagnetic lenses 130, 135 of the example apparatus 100 to simulate an effective lower beam current by adding idle time. For example, an electron beam 115 acts over approximately 0.5 millisecond at a scan speed of 4000 millimeters/second and, in the last few millimeters of the line, time multiplexing is introduced. A smooth linear decay of the beam current and/or power can be used throughout a melt pool to control quality of the weld. Time multiplexing can be customized by the controller 160 based on a type of material and can be superimposed on an existing algorithm/existing hatching to adapt for that type of material to gradually taper the beam 115, for example. Types of material can include, for example, titanium, titanium-based alloy, nickel, nickel-based super alloy, iron, iron-based alloy, aluminum, aluminum-based alloy, copper, copper-based alloy, refractory alloy, etc.

While example implementations are illustrated in conjunction with FIGS. 1-4, elements, processes and/or devices illustrated in conjunction with FIGS. 1-4 can be combined, divided, re-arranged, omitted, eliminated and/or implemented in any other way. Further, components disclosed and described herein can be implemented by hardware, machine readable instructions, software, firmware and/or any combination of hardware, machine readable instructions, software and/or firmware. Thus, for example, components disclosed and described herein can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the components is/are hereby expressly defined to include a tangible computer readable storage device or storage disk such as a memory, a digital versatile disk (DVD), a compact disk (CD), a Blu-ray disk, etc., storing the software (including computer- and/or other machine-readable instructions) and/or firmware. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts and/or process flows representative of example hardware logic, machine readable instructions, hardware implemented state machines, and/or any combination thereof for implementing the monitoring and control system for additive manufacturing 100 of FIG. 1 are shown in FIGS. 2A-4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts and/or processes illustrated in FIGS. 2A-4, many other methods of implementing the example monitoring and control system for additive manufacturing 100 can alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 2A-4 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. In addition, the term "including" is open-ended in the same manner as the term "comprising" is open-ended.

Figure 5:
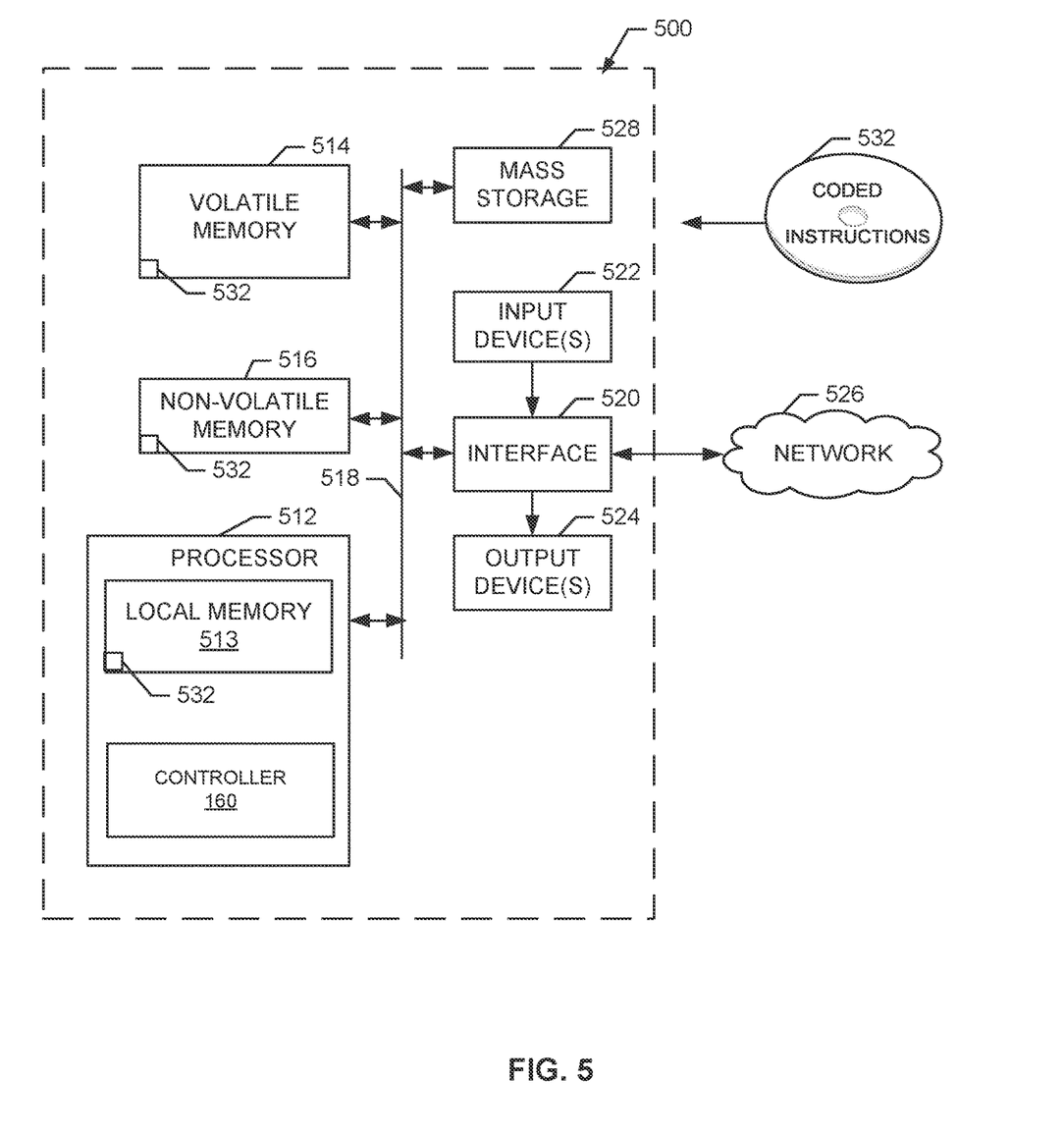
FIG. 5 is a block diagram of an example processor platform structured to executing instructions to implement the example elements disclosed and described herein.

FIG. 5 is a block diagram of an example processor platform 500 structured to executing instructions to implement the example elements disclosed and described herein. The processor platform 500 can be, for example, a server, a personal computer, a mobile device (e.g., a cell phone, a smart phone, a tablet such as an iPad™), a personal digital assistant (PDA), an Internet appliance, or any other type of computing device. The example processor platform 500 can be used to implement the example additive manufacturing controller 160, for example.

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes a local memory 513 (e.g., a cache). The example processor 512 of FIG. 5 executes instructions from the memory 513, etc. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a clock controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 representing instructions executable by the processor 512 can be stored in the mass storage device 528, in the volatile memory 514, in the non-volatile memory 516, and/or on a removable tangible computer readable storage medium such as a CD or DVD, for example.

Figure 6:
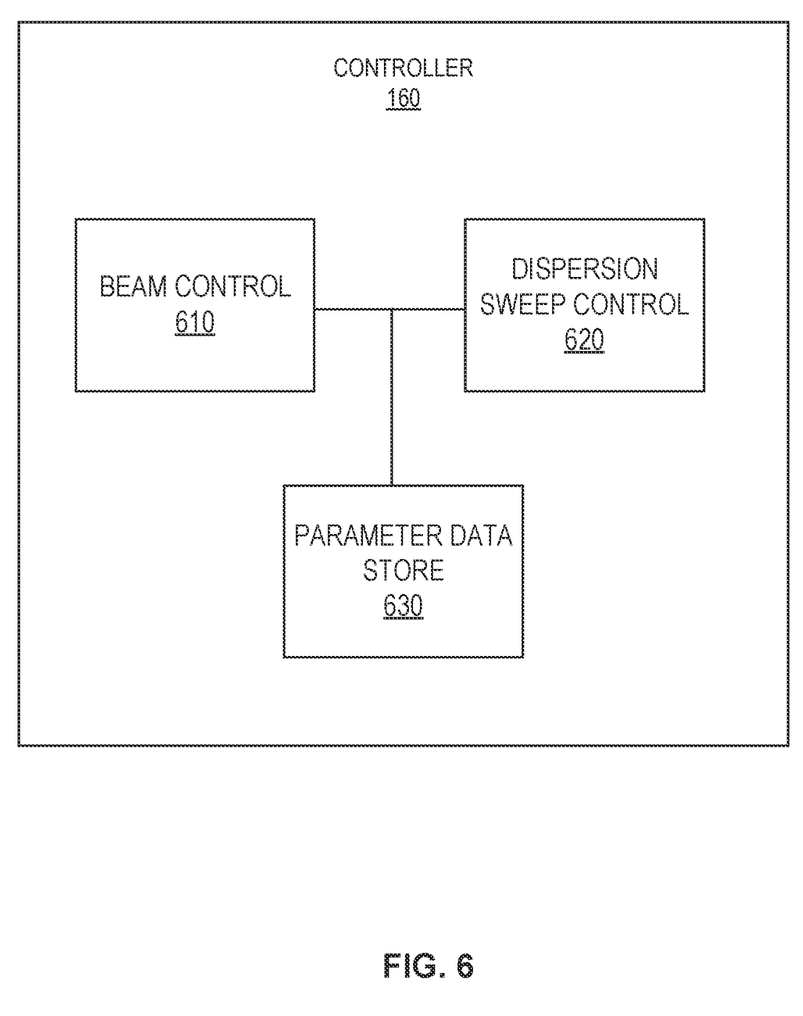
FIG. 6 is a schematic illustrating an example implementation of the controller of the example apparatus of FIG. 1.

FIG. 6 is an example schematic implementing the controller 160 of FIG. 1. As shown in the example of FIG. 6, the controller 160 includes an example beam control 610, an example dispersion sweep control 620, and an example parameter data store 630. The elements of the example controller 160 can be implemented as part of the example processing platform 500 described above, for example. In operation, the example beam control 610 extracts parameters, configuration, and/or other information/instructions to control the electron gun 110 to move the beam 115 along a certain path (e.g., along a line of a build to weld material on the workpiece 140 into a part or object, etc.). The beam control 610 works with the example dispersion control 620 to introduce one or more dispersion sweeps in the beam 115 path according to configuration, parameter/setting, etc., stored in the example data store 630. The dispersion control 620 adjusts position and/or other characteristic of the beam 115 to perform one or more dispersion sweeps as described above in connection with FIGS. 2A-4.

From the foregoing, it will be appreciated that the above disclosed methods, apparatus, and articles of manufacture have been disclosed to provide a new, improved monitoring and control system for additive manufacturing. The disclosed methods, apparatus and articles of manufacture provide dynamic, reliable adjustment of an ongoing additive manufacturing process by an additive manufacturing apparatus to improve product yield, reduce waste, and strengthen product reliability through real-time monitoring, processing, and adjustment of an additive manufacturing process for the product. The disclosed methods, apparatus and articles of manufacture are accordingly directed to one or more improvement(s) in the functioning of an additive manufacturing apparatus. Further, the capabilities of the additive manufacturing system are expanded to enable electron beam control based on time multiplexing and associated beam/sweep adjustment to reduce or avoid a defect, anomaly, or other error in manufacturing.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Further aspects of the present disclosure are provided by the subject matter of the following clauses:

Example 1 is an apparatus including: memory to store instructions; and at least one processor to execute the instructions to at least: in a first portion of a line of an object being formed, control an energy beam at a first position at a first time to form a weld from a powder; and in a second portion of a line of the object being formed, control the energy beam to perform a dispersion sweep at a second position at a second time.

Example 2 is the apparatus of any preceding clause, wherein the first position includes a welding position, and wherein the second position includes a dispersion sweep area defined separate from the welding position.

Example 3 is the apparatus of any preceding clause, wherein the dispersion sweep is performed using a set of forward and reverse dispersion sweep motions of the energy beam along the second position for a time period.

Example 4 is the apparatus of any preceding clause, wherein the energy beam is controlled to perform the dispersion sweep at the second position to taper the weld in a region of interest.

Example 5 is the apparatus of any preceding clause, wherein the second portion of the line is divided into at least a first part and a second part, and wherein the dispersion sweep is inserted before each of the first part and the second part.

Example 6 is the apparatus of any preceding clause, wherein the energy beam is an electron beam.

Example 7 is the apparatus of any preceding clause, wherein the second portion is at an end of the line toward an end of the weld.

Example 8 is the apparatus of any preceding clause, without adjusting a speed of the energy beam.

Example 9 is the apparatus of any preceding clause, wherein an effective current of the energy beam follows a 1/(1+d) curve, where d is a percentage of a total time spent on dispersion sweeps.

Example 10 is the apparatus of any preceding clause, wherein a dispersion time is determined according to a d/(1−d) curve.

Example 11 is the apparatus of any preceding clause, wherein a time period for the dispersion sweep an at interpolation step n is determined as:

$$d_n = n \frac{\text{Max Time Away}}{\text{Step Count}}, \text{ and } t_d = d_n \frac{t_m}{1 - d_n},$$

where $t_d$ is a time spent on the dispersion sweep at step n, $d_n$ is a percentage of a total time spent on dispersion sweeps at step n, and $t_m$ is a time spent on melting each segment of the line.

Example 12 is the apparatus of any preceding clause, wherein an effective current of the energy beam on segment n is represented by:

$$I_n = I_m \frac{t_m}{t_m + t_d},$$

where $I_n$ is an effective beam current on segment n, and $I_m$ is a constant beam current applied.

Example 13 includes at least one computer-readable storage medium including instructions which, when executed by at least one processor, cause the at least one processor to at least: in a first portion of a line of an object being formed, control an energy beam at a first position at a first time to form a weld from a powder; and in a second portion of a line of the object being formed, control the energy beam to perform a dispersion sweep at a second position at a second time.

Example 14 is the at least one computer-readable storage medium of any preceding clause, wherein the first position includes a welding position, and wherein the second position includes a dispersion sweep area defined separate from the welding position.

Example 15 is the at least one computer-readable storage medium of any preceding clause, wherein the dispersion sweep is performed using a set of forward and reverse dispersion sweep motions of the energy beam along the second position for a time period.

Example 16 is the at least one computer-readable storage medium of any preceding clause, wherein the second portion of the line is divided into at least a first part and a second part, and wherein the dispersion sweep is inserted before each of the first part and the second part.

Example 17 is a controller including a memory and a processor to control an additive manufacturing apparatus to at least: in a first portion of a line of an object being formed, control an energy beam at a first position at a first time to form a weld from a powder; and in a second portion of a line of the object being formed, control the energy beam to perform a dispersion sweep at a second position at a second time.

Example 18 is the controller of any preceding clause, wherein the first position includes a welding position, and wherein the second position includes a dispersion sweep area defined separate from the welding position.

Example 19 is the controller of any preceding clause, wherein the dispersion sweep is performed using a set of forward and reverse dispersion sweep motions of the energy beam along the second position for a time period.

Example 20 is the controller of any preceding clause, wherein the second portion of the line is divided into at least a first part and a second part, and wherein the dispersion sweep is inserted before each of the first part and the second part.

Example 21 is a method of controlling a weld to taper the weld using time multiplexing.

Example 22 is an apparatus including: memory to store instructions; and at least one processor to execute the instructions to at least control an electron beam for weld tapering at a trailing edge using time multiplexing.

Example 23 is an additive manufacturing apparatus including weld tapering using time multiplexing.

Example 24 is an additive manufacturing system including weld tapering at a trailing edge using time multiplexing.

Example 25 is a controller to control an additive manufacturing apparatus to implement weld tapering at a trailing edge using time multiplexing.

Example 25 is a method of weld tapering at a trailing edge using time multiplexing.

Example 26 is at least one computer-readable storage medium including instructions which, when executed by at least one processor, cause the at least one processor to at least control weld tapering at a trailing edge using time multiplexing.

What is claimed is:

1. An apparatus comprising:
memory to include instructions; and
at least one processor to execute the instructions to at least:
in a first portion of a line of an object being formed, control an energy beam at a first position at a first time to form a weld from a powder; and
in a second portion of the line of the object being formed, control the energy beam to perform a dispersion sweep at a second position at a second time,
wherein an effective current of the energy beam follows a 1/(1+d) curve along the line, where d is a percentage of a total time spent on dispersion sweeps for the line.

2. The apparatus of claim 1, wherein the first position includes a welding position, and wherein the second position includes a dispersion sweep area defined separate from the welding position.

3. The apparatus of claim 1, wherein the dispersion sweep is performed using a set of forward and reverse dispersion sweep motions of the energy beam along the second position for a time period.

4. The apparatus of claim 1, wherein the energy beam is controlled to perform the dispersion sweep at the second position to taper the weld in a region of interest.

5. The apparatus of claim 1, wherein the second portion of the line is divided into at least a first part and a second part, and wherein the dispersion sweep is inserted before each of the first part and the second part.

6. The apparatus of claim 1, wherein the energy beam is an electron beam.

7. The apparatus of claim 1, wherein the second portion is located the line in a region including an end of the weld.

8. The apparatus of claim 1, wherein, in the second portion of the line of the object being formed, the energy beam is controlled to perform a dispersion sweep at a second position at a second time without adjusting a speed of the energy beam.

9. The apparatus of claim 1, wherein a dispersion time spent on the dispersion sweeps is determined according to a d/(1−d) curve.

10. The apparatus of claim 1, wherein a time period for the dispersion sweep at an interpolation step n is determined as:

$$d_n = n \frac{\text{Max Time Away}}{\text{Step Count}}, \text{ and } t_d = d_n \frac{t_m}{1 - d_n},$$

where $t_d$ is a time spent on the dispersion sweep at step n of a StepCount number of interpolation levels, $d_n$ is a percentage of a total time spent on dispersion sweeps at step n, MaxTimeAway is a percentage of time to spend on dispersion sweeps, and $t_m$ is a time spent on melting each segment of the line.

11. The apparatus of claim 10, wherein an effective current of the energy beam on segment n is represented by:

$$I_n = I_m \frac{t_m}{t_m + t_d},$$

where $I_n$ is an effective beam current on segment n, and $I_m$ is a constant beam current applied.

12. At least one computer-readable storage medium comprising instructions which, when executed by at least one processor, cause the at least one processor to at least:
- in a first portion of a line of an object being formed, control an energy beam at a first position at a first time to form a weld from a powder; and
- in a second portion of the line of the object being formed, control the energy beam to perform a dispersion sweep at a second position at a second time,
- wherein an effective current of the energy beam follows a $1/(1+d)$ curve along the line, where d is a percentage of a total time spent on dispersion sweeps for the line.

13. The at least one computer-readable storage medium of claim 12, wherein the first position includes a welding position, and wherein the second position includes a dispersion sweep area defined separate from the welding position.

14. The at least one computer-readable storage medium of claim 12, wherein the dispersion sweep is performed using a set of forward and reverse dispersion sweep motions of the energy beam along the second position for a time period.

15. The at least one computer-readable storage medium of claim 12, wherein the second portion of the line is divided into at least a first part and a second part, and wherein the dispersion sweep is inserted before each of the first part and the second part.

16. A controller comprising a memory and a processor to control an additive manufacturing apparatus to at least:
- in a first portion of a line of an object being formed, control an energy beam at a first position at a first time to form a weld from a powder; and
- in a second portion of the line of the object being formed, control the energy beam to perform a dispersion sweep at a second position at a second time,
- wherein an effective current of the energy beam follows a $1/(1+d)$ curve along the line, where d is a percentage of a total time spent on dispersion sweeps for the line.

17. The controller of claim 16, wherein the first position includes a welding position, and wherein the second position includes a dispersion sweep area defined separate from the welding position.

18. The controller of claim 16, wherein the dispersion sweep is performed using a set of forward and reverse dispersion sweep motions of the energy beam along the second position for a time period.

19. The controller of claim 16, wherein the second portion of the line is divided into at least a first part and a second part, and wherein the dispersion sweep is inserted before each of the first part and the second part.

* * * * *